United States Patent
Kanda

(10) Patent No.: US 7,212,307 B2
(45) Date of Patent: May 1, 2007

(54) IMAGE DATA STORAGE SYSTEM

(75) Inventor: Yoshimichi Kanda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 773 days.

(21) Appl. No.: 10/247,347

(22) Filed: Sep. 20, 2002

(65) Prior Publication Data

US 2003/0072033 A1 Apr. 17, 2003

(30) Foreign Application Priority Data

Sep. 20, 2001 (JP) ............................. 2001-287545

(51) Int. Cl.
*G06F 15/00* (2006.01)
*G06K 1/00* (2006.01)

(52) U.S. Cl. .................... 358/1.16; 711/161; 711/162; 711/154; 711/153; 711/159; 711/5; 711/100; 711/101; 711/108; 711/150

(58) Field of Classification Search ................ 711/161, 711/153
See application file for complete search history.

(56) References Cited

U.S. PATENT DOCUMENTS

| | | | |
|---|---|---|---|
| 5,101,438 A | | 3/1992 | Yoshimichi et al. |
| 5,249,288 A | * | 9/1993 | Ippolito et al. .............. 714/8 |
| 5,333,211 A | | 7/1994 | Yoshimichi et al. |
| 5,408,337 A | | 4/1995 | Yoshimichi |
| 5,673,340 A | | 9/1997 | Yoshimichi |
| 5,745,606 A | | 4/1998 | Yoshimichi |
| 5,867,611 A | | 2/1999 | Yoshimichi |
| 6,023,343 A | * | 2/2000 | Hoang et al. ............... 358/1.16 |
| 6,160,629 A | * | 12/2000 | Tang et al. .................. 358/1.1 |
| 6,486,976 B1 | * | 11/2002 | Nakamura et al. .......... 358/474 |
| 6,646,758 B1 | * | 11/2003 | Anderson et al. .......... 358/1.15 |
| 6,704,118 B1 | * | 3/2004 | Hull et al. .................. 358/1.15 |
| 6,832,010 B2 | * | 12/2004 | Miyazaki et al. ........... 382/305 |
| 6,876,010 B1 | * | 4/2005 | Keller et al. ................ 382/128 |
| 6,993,194 B2 | * | 1/2006 | Nakamura .................. 382/232 |
| 2002/0138697 A1 | | 9/2002 | Yoshimichi |

FOREIGN PATENT DOCUMENTS

EP 0 449 313 A2 10/1991

(Continued)

OTHER PUBLICATIONS

Decision of rejection of Japanese Patent Application No. 2001-287545, (date of issue—Jun. 20, 2006).

*Primary Examiner*—King Y. Poon
*Assistant Examiner*—Benjamin Dulaney
(74) *Attorney, Agent, or Firm*—Dickstein Shapiro LLP

(57) ABSTRACT

A CPU determines whether the intended use of the image data to be stored in a plurality of HDDs has a first-type purpose, which requires storing temporarily stored image data for carrying out output processing of the image data, or a second-type purpose, which requires long-term preservation of the image data. If the first-type intended use is determined, a first-type mode for saving is selected, wherein the image data to be stored are divided and each divided set of image data is stored into one HDD. If the second-type intended use is determined, a second-type mode for saving is selected, wherein the same image data part is saved in a plurality of storage means.

10 Claims, 18 Drawing Sheets

FOREIGN PATENT DOCUMENTS

| | | |
|---|---|---|
| EP | 0 507 026 A2 | 10/1992 |
| JP | 10-93788 A | 4/1998 |
| JP | 10-162488 | 6/1998 |
| JP | 2000-032243 | 1/2000 |
| JP | 2001-28674 A | 1/2001 |
| JP | 2001-100929 | 4/2001 |
| JP | 2001-191594 | 7/2001 |

* cited by examiner

FIG.4

| | 31　　　　24 | 23　　　　16 | 15　　　　8 | 7　　　　0 |
|---|---|---|---|---|
| 6000 | HDCON | | | |
| 6008 | SECCOUNTW | | | |
| 6010 | SECCOUNTR_D | SECCOUNTR_C | SECCOUNTR_B | SECCOUNTR_A |
| 6018 | SECNUMW | | | |
| 6020 | SECNUMR_D | SECNUMR_C | SECNUMR_B | SECNUMR_A |
| 6028 | CYLLOW | | | |
| 6030 | CYLLOR_D | CYLLOR_C | CYLLOR_B | CYLLOR_A |
| 6038 | CYLHIW | | | |
| 6040 | CYLHIR_D | CYLHIR_C | CYLHIR_B | CYLHIR_A |
| 6048 | COMMAND | | | |
| 6050 | STATUS_D | STATUS_C | STATUS_B | STATUS_A |

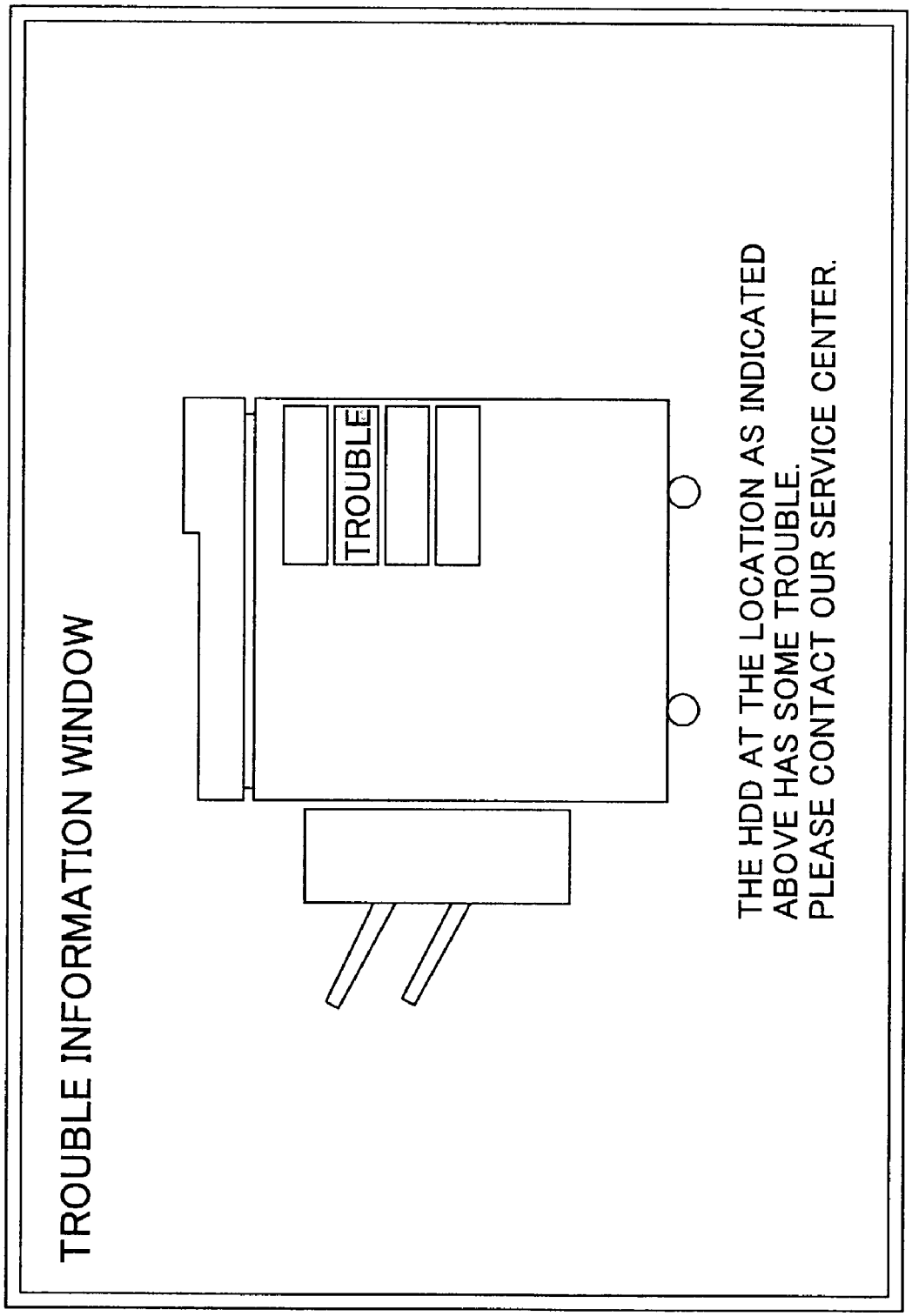

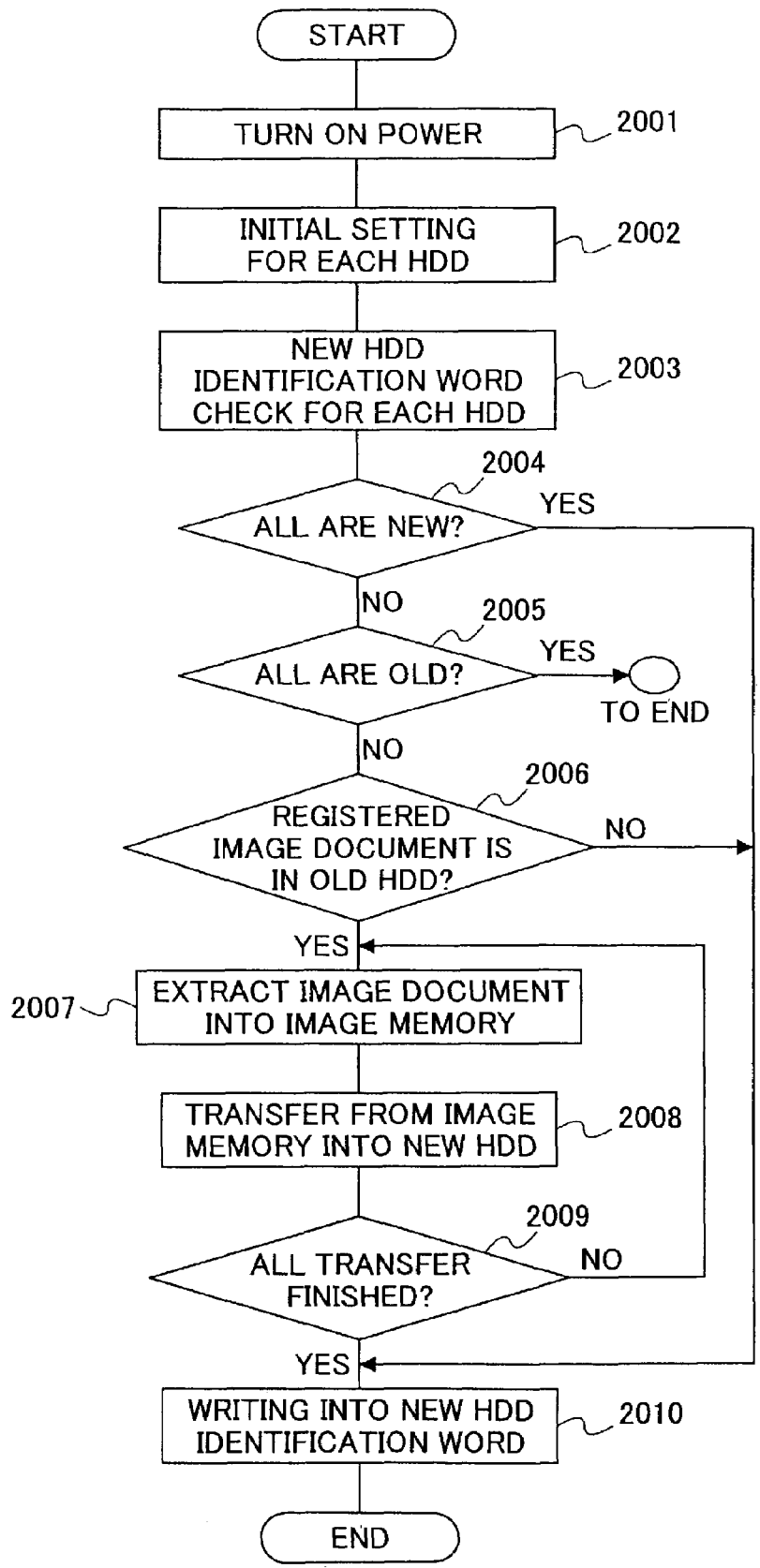

IMAGE DATA STORAGE SYSTEM

BACKGROUND OF THE INVENTION

1. Field of the Invention

The present invention generally relates to an image data storage system or apparatus that has a plurality of storage means for storing the image data. More specifically, the present invention relates to such an image data storage system or apparatus that has a plurality of storage means for storing the image data to be used in a digital copying machine.

2. Description of the Related Art

As one of today's known digital copiers, there is a digital copier that has a hard disk drive (hereinafter referred to as HDD) as a means for storing image data. A HDD as such has been utilized for a function that stores the image data once and then uses the data, e.g., an electronic sorting function, an image registration function, etc. In the electronic sorting function, original image data are obtained by scanning a plurality of pages or sheets, then the obtained original image data sets are stored into a HDD and thereafter each image data set in the order of its corresponding page number is read out from the HDD for the purpose of making printouts. This function enables delivery of sorted copier-paper printouts without a more-conventional, sorting-hardware mechanism, which has a plurality of sorting bins. On the other hand, in the image registration function, a plurality of form images (sets) as the registration images are stored into the HDD and thereafter printouts can be made on an on-demand basis, eliminating the necessity of a scanning process that would otherwise be required each time when additional copies are made.

Nowadays, we have seen the necessity of using a plurality of HDDs in parallel for storing the image data in order to keep up with the requirements of higher speeds in print-out performance while using the electronic sorting function, not to speak of the requirements of high speeds due to the increases in amount of information to be handled, which come from recent years preferences for high resolution images. For instance, an A4-sized and 1,200-dpi image amounts to about 17 MByte of data, when each pixel is considered to occupy 1 bit. If a print-out performance of 120 pages per minute are required, the required data transfer rate of the HDD would be about 34 MBytes per second, as is obtained by the calculation of: (17 MBytes×120)/60 sec.=34 MBytes/sec. However, at present, a typical data transfer rate of a reasonable HDD is about 20 MBytes/sec., which is unable to satisfy the above data transfer rate requirement of 34 Mbytes per sec. Thus, in order to satisfy the above print-out speed requirement, two HDDs simultaneously operated in parallel are utilized, which achieves a data transfer rate of about 40 Mbytes per sec. There is another approach to improve the data access speed without the use of a plurality of HDDs: Japanese unexamined patent publication (KOKAI) No. 2000-32243 shows a copier apparatus utilizing a HDD, with a consideration of data access rates which vary depending on various storage areas of the HD (hard disk), which seems to be able to temporarily improve the data access speed of the same HD.

On the other hand, registered document-form images or those in conjunction with the image registration function that are preserved as stored data in a hard disk tend to be utilized a number of times. Therefore, what is important is the reliability, i.e., the prevention of loss of correct data due to malfunctions, etc., rather than the print-out speeds. In this respect, the aforementioned Japanese unexamined patent publication (KOKAI) No. 2000-32243 does not seem to teach any reliability considerations on its preserved data in its HDD.

SUMMARY OF THE INVENTION

It is therefore a first object of the present invention to provide an image data storage system having a plurality of image data storage means, which satisfies both the requirements of the high speed transfer of the image data and of the data reliability.

A second object of the present invention is to make a choice based on the intended use of the image data that are to be stored in HDDs, the choice being made so that the image data are divided and stored into a plurality of HDDs, each having a divided piece of the image data and/or the image data is stored in a plurality of HDDs, each having the same data. Thus, as for data that require a high access rate of HDDs, high, access rate is made possible, and as for data of which its preservation is important, the same data can be output from another HDD even if one HDD fails to operate properly. Consequently, the HDDs are controlled to store data in accordance with the intended use of the data.

A third object of the present invention is to make a choice between data so as not to use data in a HDD if there is a data abnormality in said HDD, when the data stored by a storing mode of storing identical data into a plurality of storage means is read out, thereby preventing the adverse effect that can occur due to data abnormality caused by a HDD that has failed to operate properly.

A fourth object of the present invention is to identify or pinpoint a HDD that has an abnormality in an image data storage system utilizing a plurality of HDDs, thereby providing a clear-cut notice to its user.

A fifth object of the present invention is to arrange so that when a HDD (in a system which utilizes the mode of storing identical data in a plurality of HDDs) is replaced due to its malfunction, etc., the data that is stored for intended long time preservation and use is transferred from one of the other HDDs and is stored into a replacement HDD, thereby sustaining data maintainability, in order to enhance the maintainability of data stored with intended long-term preservation and use.

The objects of the present invention can be achieved based on an image data storage system or apparatus, comprising:

a plurality of storage means for storing image data;

means for determining intended use of the image data that is stored at said image data storage means;

selection means for selecting a given type of image storing mode for storing said image data into one of said storage means, wherein the selection is performed based on the determined intended use of image data; and data saving means for saving said image data into at least one of said plurality of said storage means in accordance with the image storing mode selected by said selection means.

In the above system, it is preferable that said selection means select one of:

a first storage mode for storing image data divided into sets of data, each of said sets of data being respectively stored into a corresponding one of said plurality of said storage means; and a second storage mode for storing image data into at least two of said plurality of storage means, each of said at least two storage means storing an identical part of said image data.

Further, in the above system, it is also preferable that said intended use of said image data includes a first intended use and a second intended use, wherein said first intended use is to temporarily store said image data for a time period of output process of said image data and said second intended use is to store said image data for long-term preservation of said image data, and wherein said selection means selects said first mode when said intended use is said first intended use and selects said second mode when said intended use is said second intended use.

In any one of the above systems, it is also preferable that said determining means determine said intended use in accordance with information provided through input means operated by a user.

In any one of the above systems, it would be also preferable to further arrange so that data other than image data are stored by said second storage mode.

In any one of the above systems, it would be also preferable to further arrange so that when the data stored by said second mode are read out, each data part is read out from each of said at least two of said plurality of storage means, and determination is made on whether said data part read out from one of said plurality of storage means is abnormal data so as to select and output said data part read out from one of said image data storage means other than the abnormal data.

Further, in the above system, it would be also preferable for said system to display a notice with respect to said image data storage means in which said abnormal data has occurred.

In any one of the above systems, it would be also preferable to further arrange so that when the system is initialized and if a certain image data storage means that lacks a history of usage has been detected based on histories of usage in said plurality of storage means, the data stored by said second mode in one of said storage means that has usage history is duplicated into said image data storage means that lacks said history of usage.

In any one of the above image data storage systems, HDDs can be employed as the plurality of the image data storage means.

Any one of the above image data storage systems are useful, for example, when provided in an image formation apparatus such as a copier, a printer or a fax machine.

Other features that may be employed to help further achieve the objects together with the advantageous effects of the present invention will become apparent by reference to the following detailed description when considered in connection with the accompanying drawings.

BRIEF DESCRIPTION OF THE DRAWINGS

FIG. 4 is a diagram in explanation of an example of a register configuration for HDD I/Fs (HDD interfaces) A–D (303–306) shown in FIG. 3;

FIG. 19 is a detailed view of a malfunction notice window, which appears in the LCD of the user operation panel of FIG. 14; and FIG. 20 is a flow chart of a new HDD detection process and its related data copying process of the present invention.

DETAILED DESCRIPTION OF THE PREFERRED EMBODIMENTS

According to the general principle of the present invention, a plurality of HDDs are utilized. The data storing format in these HDDs can be varied in response to an intended use of the incoming image data, in such a manner that a data storing mode that is suitable for the intended use, in view of speeds and data maintainability, etc., is selected. Embodiments of the present invention are described below.

Figure 1:
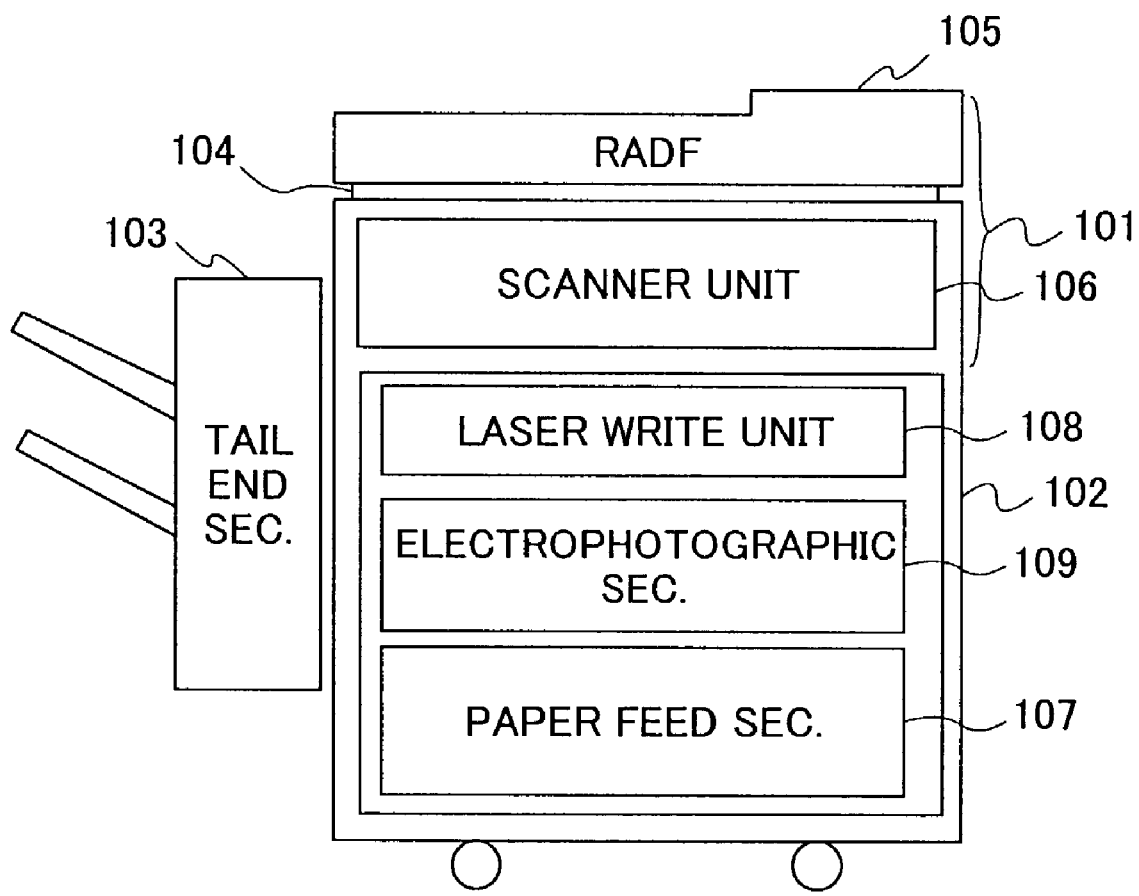
FIG. 1 is a schematic illustration of a copier showing an example of an image data storage system of the present invention.

FIG. 1 is a schematic illustration of a digital copier, which relates to an embodiment of the present invention. In this copier, a scanner section 101 and a laser-recorder section 102 perform image formation and printing onto the paper. A tail end process section 103 jogs output papers, staples them, punches them, etc. The scanner section 101 includes an original document table or original glass plate 104 made of clear glass, a reversing automatic document feeder (hereinafter referred to as RADF) 105 that feeds an original copy along the upper surface of the glass plate 104, and a scanner unit 106 that obtains image data by scanning the original copy during its stay on the upper surface of the glass plate 104.

The RADF 105 has a first path for feeding of single-sided original copies and a second path for feeding of double-sided original copies in order to handle both types of original copies. The first path extends from an original receiving tray (not shown), via the original glass plate 104, to an outlet tray (not shown). As for a double-sided original copy, when the original copy has been scanned by the scanner unit 106, it is reversed and guided again onto the original glass plate in the second path. The scanner unit 106 illuminates the original copy with a lamp. The scanner unit 106 arranges that the reflected light from the original copy is focused with a lens, a mirror, etc., in order to obtain imaging on an acceptance surface of photoelectric conversion element. The photoelectric conversion element obtains an electrical signal by converting the incoming reflected light and outputting the electric signal into an image processing section, which will be described later.

The image data obtained by the scanner section 101 is output into the laser-recorder section 102. The laser-recorder section includes a paper feed section 107 for feeding paper, a laser-writing (or laser write) unit 108 and a electrophotographic processing section 109. The paper feed section 107 has a secondary paper-feed path which, in a double-sided copying mode, reverses or turns over the faces of, and guides into the electrophotographic processing section 109 again, the copier paper that has passed the fixing roller.

The laser write unit 108 has a semiconductor laser that radiates laser light based on the image data provided from the image processing section. The light radiated from the semiconductor laser is directed to achieve light distribution onto the surface of a photosensitive drum of the electrophotographic processing section 109 via a mirror and a lens. An electrostatic latent image is formed on the surface of the photosensitive drum. With the toner supplied from an image development or photofinishing unit, the forming of a toner image is carried out.

The toner image is transferred onto the paper that has been guided into position from the paper feed section 107. After that, the toner image is heated and pressed with the fixing roller. As a result, the toner image is melted and thereby fixed onto the surface of the paper. The write process onto the paper is thus completed, followed by the processes performed at the tail end section 103 such as jogging, stapling and/or punching of grouped output papers, which are then delivered on a tray.

Figure 2:
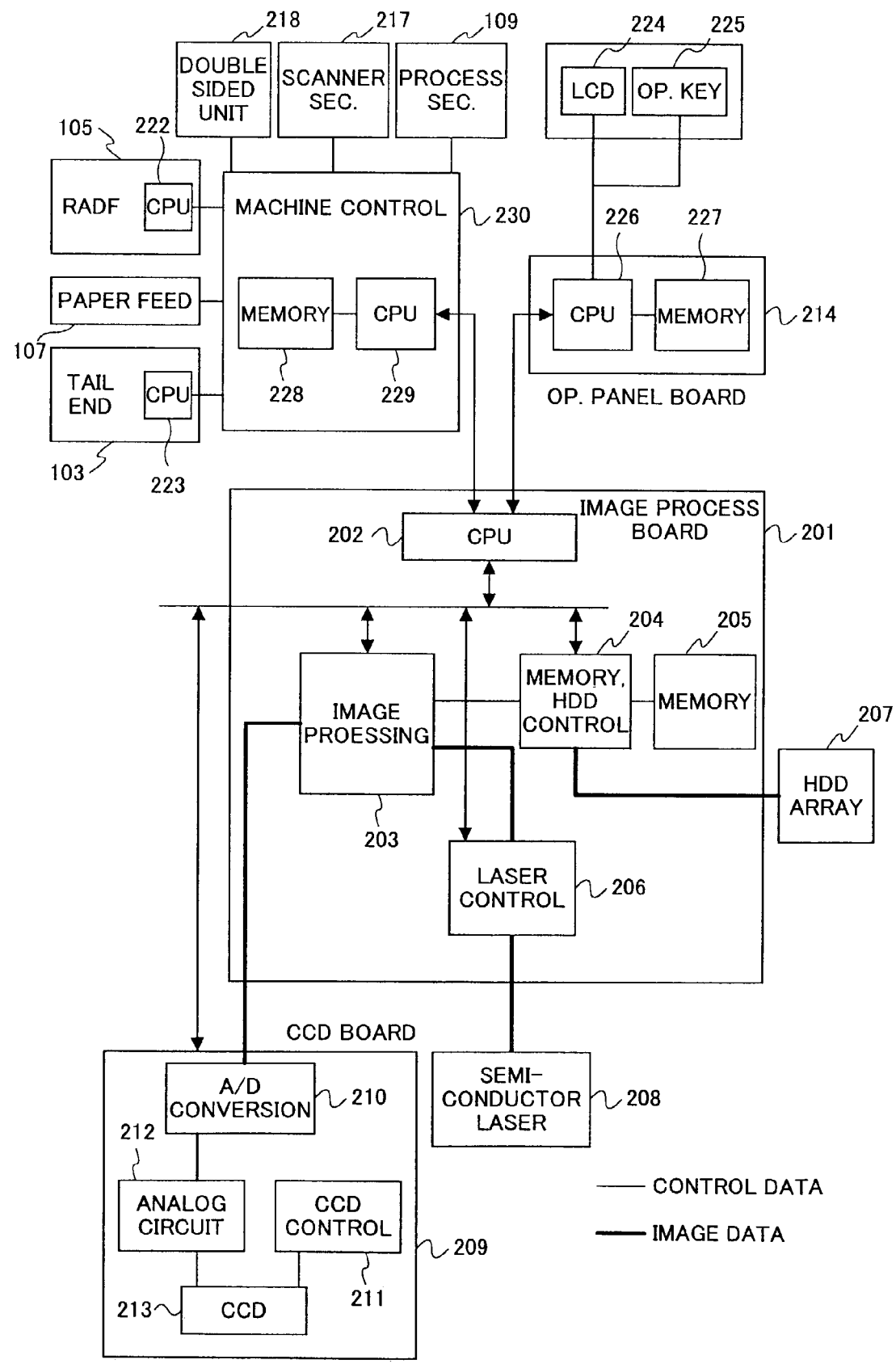
FIG. 2 is a block diagram showing the overview of the control system section of the copier shown in FIG. 1.

FIG. 2 is a block diagram showing the overview of the control section of the aforementioned copier. The control section of the copier controls, by means of a CPU 202 on the image processing board 201, and further via CPUs 226 and 229 on boards 214 and 230, respectively, which are located for each unit, those equipment sets each of which constitutes a unit, in a totalized or across-the-board manner. More specifically, the control section of the copier is made up of an operation panel board 214, a machine control board 230, a CCD board 209 and the image processing board 201. The operation panel board 214 is in charge of a user operation panel located on an upper surface of the copier. The machine control board 230 is in charge of each equipment set within the copier. The CCD board 209 provides a mount for the photoelectric conversion element accompanied by its peripheral parts. The image processing board 201 provides a mount for the CPU 202 accompanied by its peripheral parts. The CPU 202 performs a variety of image processing operations on the image data.

The processing of the image data in a copying mode in the copier is discussed in the following. The images of the original copies fed from the RADF 105 and positioned on the original glass plate 104 are obtained one after another through scanning by means of the scanner unit 106. The CCD (charge coupled device) 213 on the CCD board 209 in the scanner unit 106 is driven by a CCD control section 211. The output signal of the CCD goes through a gain adjustment at an analog circuit 212, and is sent as 8-bit image data from an A/D conversion section 210 to the image processing section 203 on the image processing board 201. The image data which have gone through a given image processing at the section 203 are then stored into a memory 205 by means of a memory/HDD control section 204. The image data stored in the memory 205 is then stored into an HDD array 207, which has four HDDs.

These processes are carried out on all the original copies that have been placed into the RADF 105. Thus, the image data for a plurality of pages of the original copies are stored in the HDD array 207. When the image scanning is finished, image data for each page are read out by means of the memory/HDD control section 204 for a set number of times and then goes through a given image processing at section 203, and after that, are sent through a laser control section 206 into a laser write section 208. Therefore, the scanning operation is necessary only once, whether or not the image formation of each original copy has to be repeated for a plurality of times, i.e., for a set number of copies to be produced.

Figure 3:
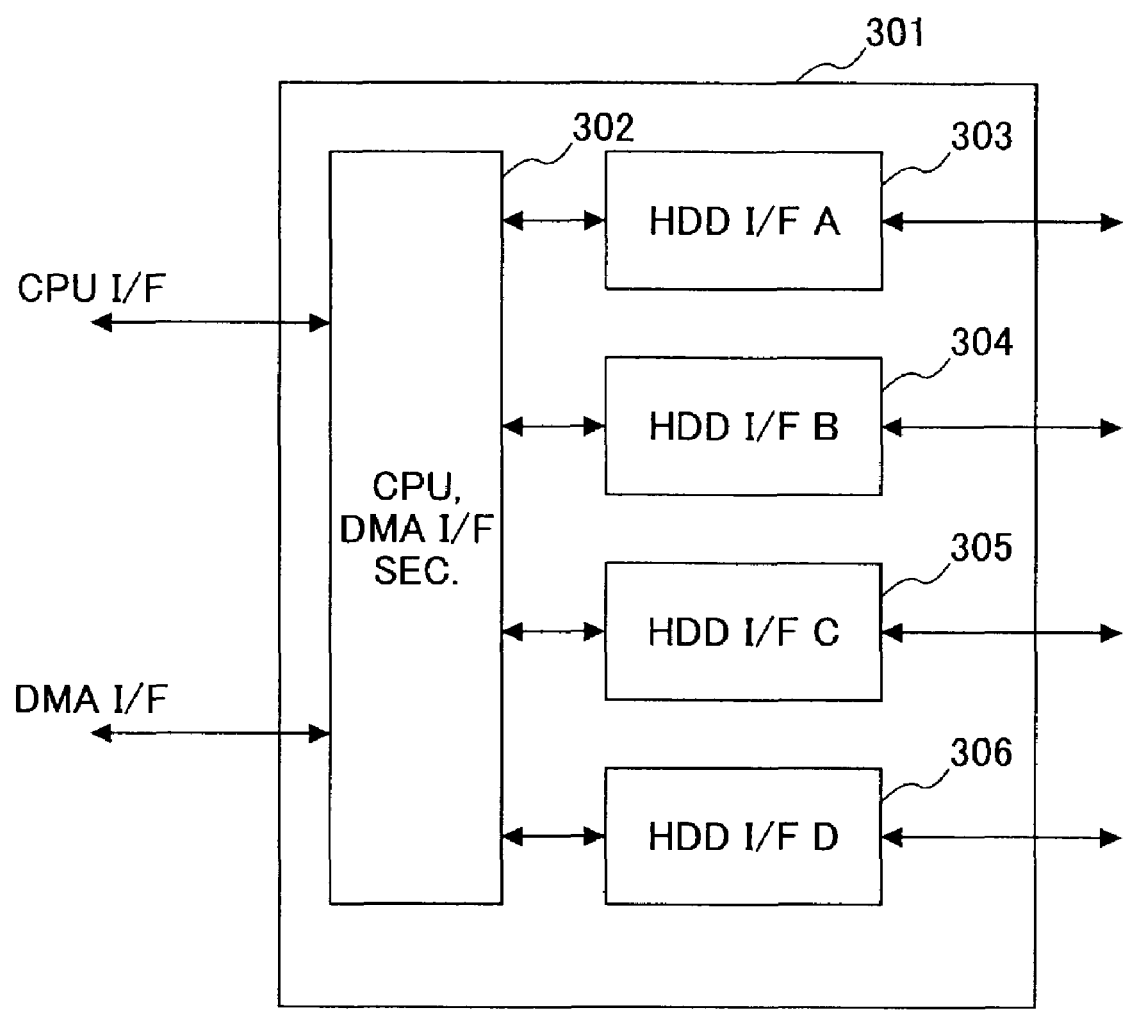
FIG. 3 is a block diagram showing a HDD array controller IC of a HDD control section shown in FIG. 2.

Now, methods for storing the image data into HDDs are described. The memory/HDD control section 204 includes a memory control IC 902 (shown in FIG. 13) that interfaces with both the memory 205 and the image processing section 203. The section 204 also includes an HDD array control IC 301 (shown in FIG. 3) that is in charge of the data transfer between the memory control IC 902 and the HDD array 207. FIG. 3 is a block diagram showing the internal blocks of the HDD array control IC 301. The IC 301 includes a CPU/DMA I/F section 302 and HDD I/Fs 303–306 (or HDD interfaces A–D, wherein the sub-names "A", "B", "C" and "D" here mean equal configurations). The CPU/DMA I/F section 302 receives accesses such as "REGISTER", "READ", "WRITE" etc., from the CPU 202 and accesses from a DMA control IC 502 (shown in FIG. 5). The HDD I/Fs 303–306 (A–D) receive commands and data from the CPU/DMA I/F section 302, and perform control and data transfer independently to respective HDDs (A–D).

FIG. 4 shows registers that are set via the CPU I/F (CPU interface). The registers have a 4-byte configuration, with address 6000H storing HDCON and with address 6008 storing SECCOUNTW. The HDCON performs setting of the HDD array control IC, for instance, switching of HDDs. The SECCOUNTW performs "WRITE" into SECTOR COUNT registers of the HDDs.

SECCOUNTR_A–D to be stored at the address 6010H as shown in FIG. 4 can read out values read from respective SECTOR COUNT registers of the HDDs (A–D). The SECTOR COUNT registers of the HDDs (A–D) indicate the sector count numbers transferred when the data transfer is performed. In this embodiment, since different settings are not made among the HDDs (A–D), i.e., since settings are equal to each other among the HDDs (A–D), each register for writing into the HDDs (A–D) is configured to allow writing of one value. On the other hand, in this embodiment, since different values can be read out from the HDDs (A–D) simultaneously, each register for readout is configured to allow four values to be read out simultaneously.

In the same way, respective one of the data "sector number write" ("SECtor NUMber Write"; or SECNUMW in FIG. 4), "sector number read" ("SECtor NUMber Read"; or SECNUMR_ in FIG. 4), "cylinder number LOW write" ("CYLinder number LOw Write"; or CYLLOW in FIG. 4), "cylinder number LOW read" ("CYLinder number LOw Read"; or CYLLOR$_{13}$ in FIG. 4), "cylinder number HIGH write" ("CYLinder number HIgh Write"; or CYLHIW in FIG. 4), "cylinder number HIGH read" ("CYLinder number HIgh Read"; or CYLHIR_ in FIG. 4), is stored at respective one of the addresses 6018H, 6020H, 6028H, 6030H, 6038H and 6040H. These addresses are such storage areas. The registers at the addresses 6018–6040H for the HDDs (A–D) indicate values regarding the internal address setting of the HDDs (A–D). The register at 6048H is to issue a command such as a data transfer to the HDDs. Since a command (COMMAND) is only for writing into the HDDs (A–D), there is no register for readout of command (from the HDDs). The status register at 6050H is to read (READ) the statuses (STATUS_A–D) of the HDDs (A–D), which are only read out from the HDDs (A–D), therefore, there is no register for writing them (into the HDDs).

Next, operations of accessing the HDDs (A–D) by accessing these registers are described. When the settings of the registers are done, then the CPU/DMA I/F section 302 decodes the addresses of the registers and issues IDE I/F signals, i.e., CS (Chip Select) and AD (Address), a R/W setting signal, a register setting value (CPUdata) and a data transfer starting trigger signal RTRG, to the HDD I/Fs 303–306 (A–D).

Figure 5:
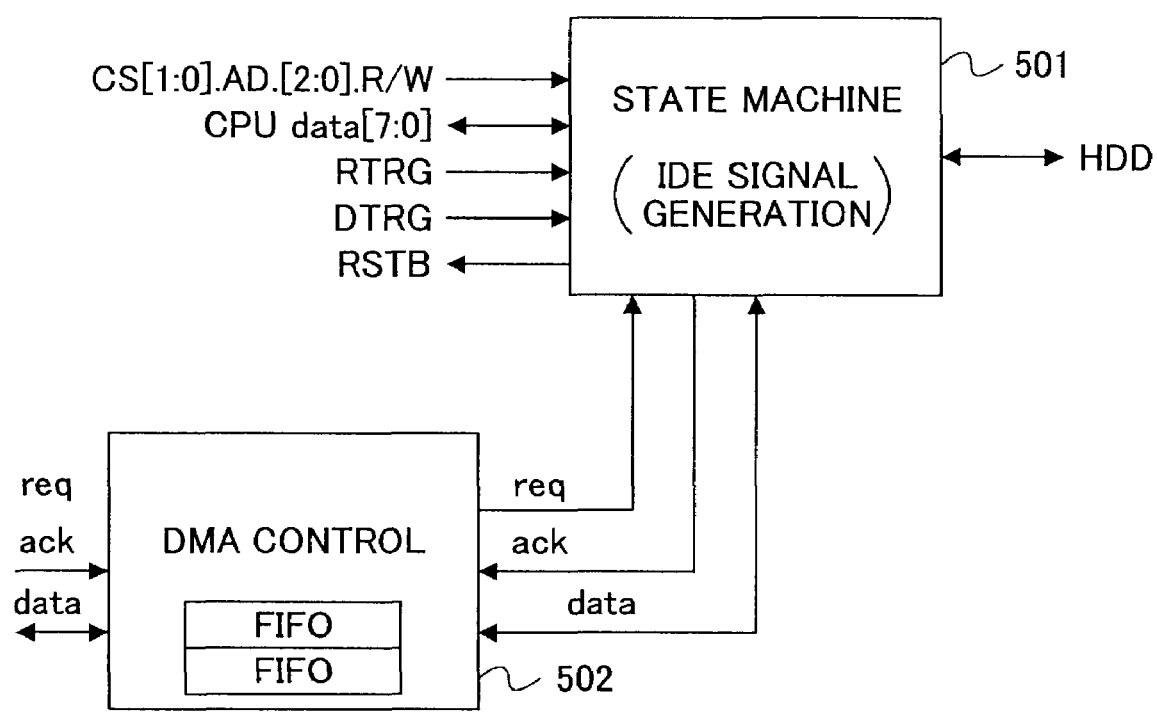
FIG. 5 is a diagram in explanation of an example of a detailed internal construction of one of the HDD I/Fs A–D (303–306) shown in FIG. 3.
Figure 6:
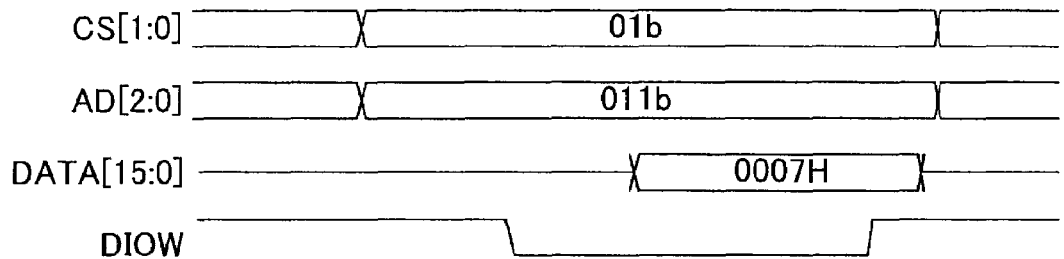
FIG. 6 is a timing chart of main signals that occur when a state machine (shown in FIG. 5) in one of the HDD I/Fs A–D (303–306) shown in FIG. 3 is in its HDD-writing operation.

FIG. 5 is a block diagram showing inner blocks of one of the HDD I/Fs A–D (303–306). Shown in it is a state machine 501, which is activated by receiving the data transfer starting trigger signal RTRG and then performs the data transfer into the HDDs (A–D). FIG. 6 shows an example of a timing chart showing signals that occur when the state machines 501 are writing into the HDDs (A–D). In this example, by writing "07" into a register at 6008H, "CS[1:0]=01b, AD[2:0]=011b" is assigned to the HDDs (A–D) and by asserting a DIOW signal, writing that is directed to 07H is performed into the sector count registers of the HDDs (A–D).

Signals from the CPU/DMA I/F section 302 are simultaneously issued to the HDD I/Fs A–D (303–306). Consequently, IDE signals that are identical to each other are simultaneously issued to the HDDs (A–D). When the writing into the HDDs (A–D) is finished, the state machines 501 issue RSTB (return strobe) signals to the CPU/DMA T/F section 302. All the HDD I/Fs A–D (303–306) having issued RSTB signals, then the CPU/DMA I/F section 302 allows CPU 202 to proceed to next register setting.

Figure 7:
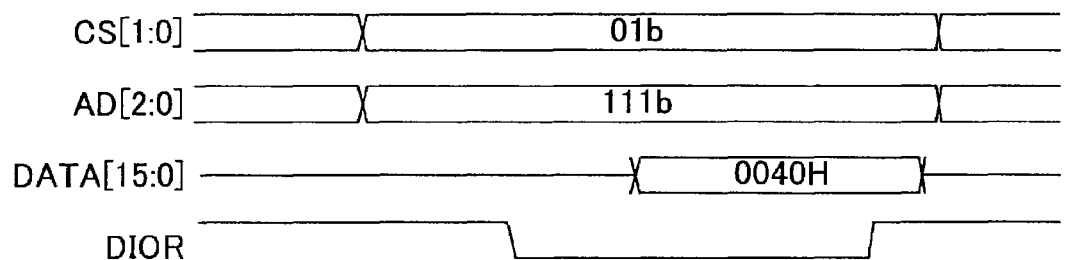
FIG. 7 is a timing chart of main signals that occur when the state machine (shown in FIG. 5) is in its HDD-reading operation.

FIG. 7 shows an example of signals that occur when the state machines 501 are reading the HDDs (A–D). In this example, by reading a status register that is located at 6050H, "CS[1:0]=01b, AD[2:0]=111b" is assigned from the state machine 501 to the HDD (A–D) and by asserting a DIOR signal, reading out from the status register is performed.

Signals from the CPU/DMA I/F section 302 are simultaneously issued to the HDD I/Fs A–D (303–306). Consequently, IDE signals that are identical to each other are simultaneously issued to the HDDs (A–D). When the reading of the HDDs (A–D) is finished, the state machines 501 issue RSTB (return strobe) signals to the CPU/DMA I/F section 302. All the HDD I/Fs A–D (303–306) having issued RSTB signals, then the CPU/DMA I/F section 302 notifies the CPU 202 that the read-out data are valid.

Figure 8:
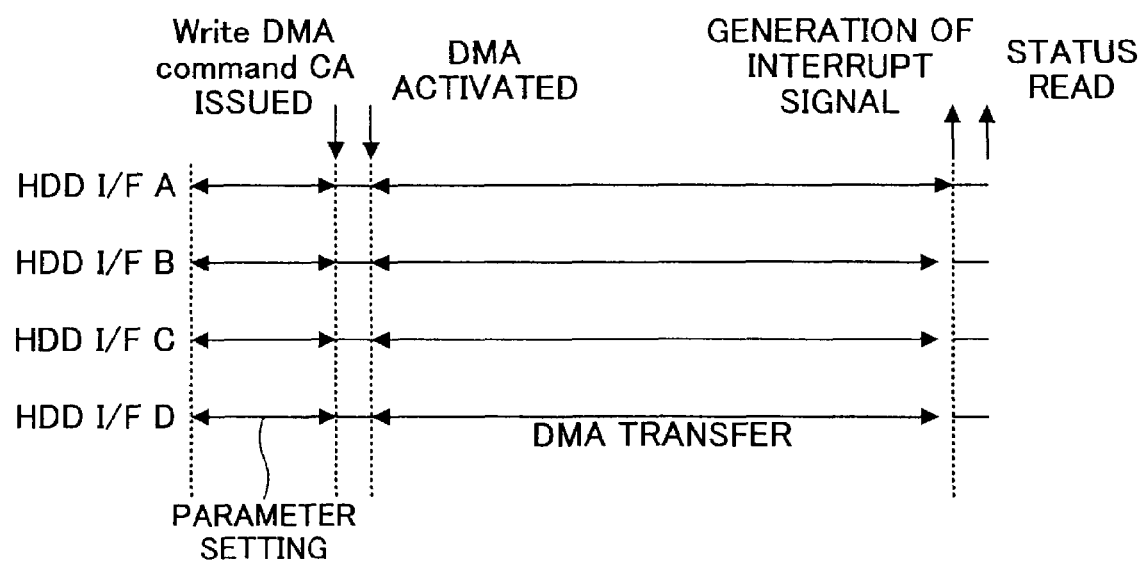
FIG. 8 is a diagram in explanation of an example of a DMA transfer scheme of the HDD I/Fs A–D (303–306) shown in FIG. 3.

Next, the DMA transfer from the memory 205 to the HDDs (A–D) is described. FIG. 8 shows an example of the DMA transfer scheme of the HDD I/Fs A–D (303–306). The CPU 202 perform a writing into a register of the HDD array control IC 901 (shown in FIG. 9), which causes the HDD array control IC 901 to perform setting of parameters (such as a transfer sector count number and an address in a storage area needed for the DMA transfer) in HDDs (A–D). After setting the necessary parameters, the CPU 202 writes a command CAH (for DMA writing) into a register for command issuance (COMMAND at 6048H in FIG. 4), which causes the HDD array control IC 901 to issue the command CAH to the HDDs (A–D). The command having been issued, the HDDs (A–D) are brought into a wait state for the data transfer.

The CPU 202 sets the RW bit of a register for the data transfer of the register (HDCON at 6000H) of the DMA control IC 901 to "1", thereby activating the data transfer from the memory 205 to the HDDs (A–D). After that, a bit DEXE, which is a MSB data transfer start bit of the register (HDCON at 6000H) of the HDD array control IC 901, is set, thereby causing the HDD array control IC 901 to receive the data read out by the DMA control IC 502 from the memory 205 and to write it into the HDDs (A–D).

When the transfer start bit is set, the CPU/DMA I/F section 302 issues the DMA transfer start trigger signal DTRG to each of the state machines 501 (shown in FIG. 5) in the HDD I/Fs A–D (303–306). Then the state machine 501 generates a HDD interface signal at a timing for DMA transfer. When the DMA transfer is finished in accordance with the sector counter number of the setting, the HDDs (A–D) issue interrupts to notify of the completion of the data transfer. More specifically, since each of the HDDs (A–D) are operating with respective independent interfaces, the data transfer rates of the HDDs are different from each other, therefore, each interrupt signal from each of the HDDs (A–D) is connected to the CPU/DMA I/F section 302, so that when all these interrupt signals have arrived, then an interrupt signal is issued to the CPU 202. Upon receiving this interrupt, the CPU 202 reads the status register at the address 6050H to check up on the after-DMA-transfer statuses of the HDDs (A–D).

Figure 9:
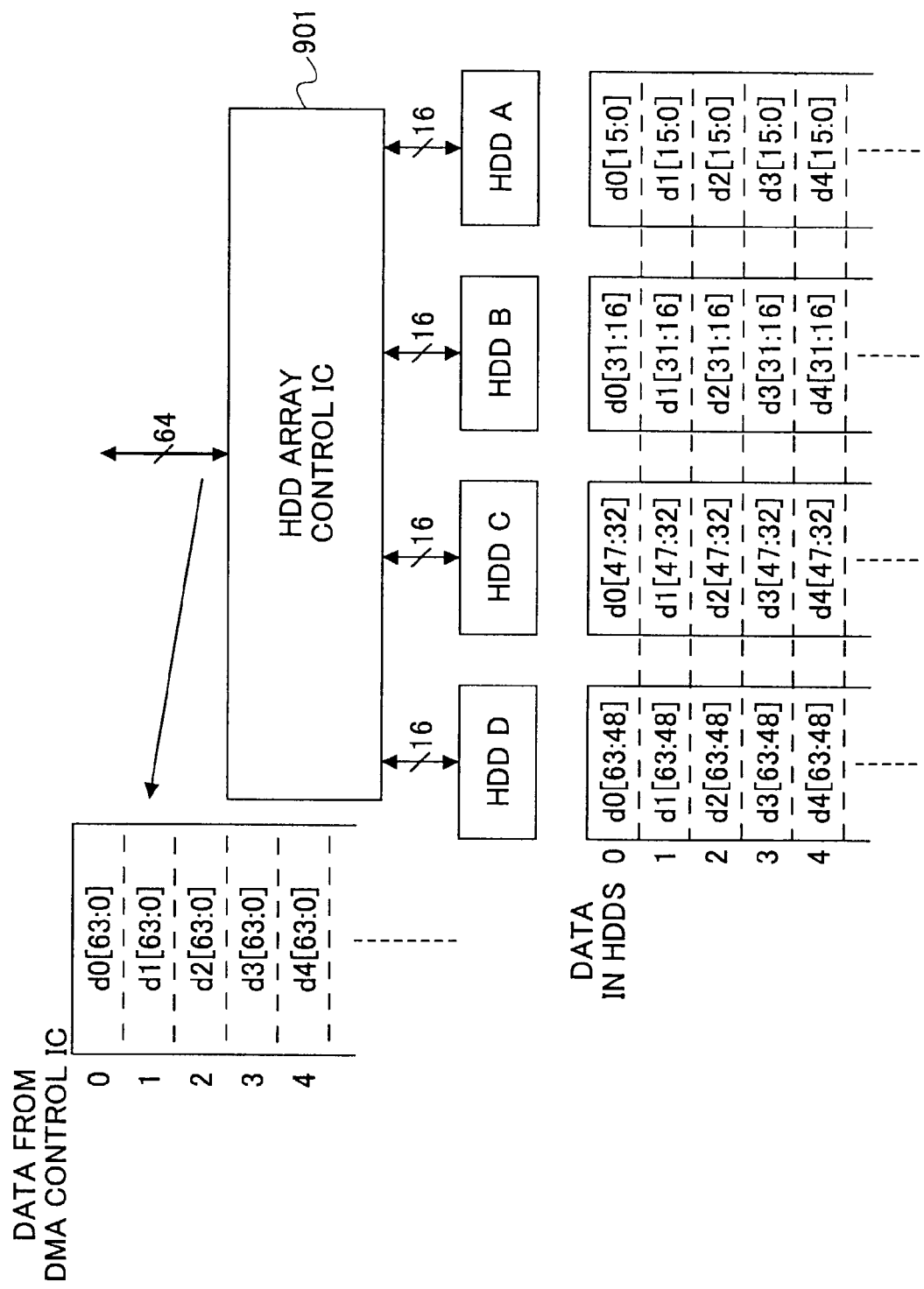
FIG. 9 is a diagram in detailed explanation of an example of how the data are divided and stored in the HDDs.

Now, data transfer modes (for transferring data to the HDDs (A–D)) established in accordance with the present invention are described. There are two types of modes (a first-type mode and a second-type mode) in which the HDD array control IC 901 can make the HDDs (A–D) store the data from the memory control IC 902. In the first-type mode, the assignment of 64-bit data from the DMA control IC 502 is shown in FIG. 9 and the data bus between the memory control IC 902 and the HDD array control IC 901 is 64-bit, wherein the data are transferred in the order of d0, d1, d2, . . . as shown in FIG. 9.

Figure 10:
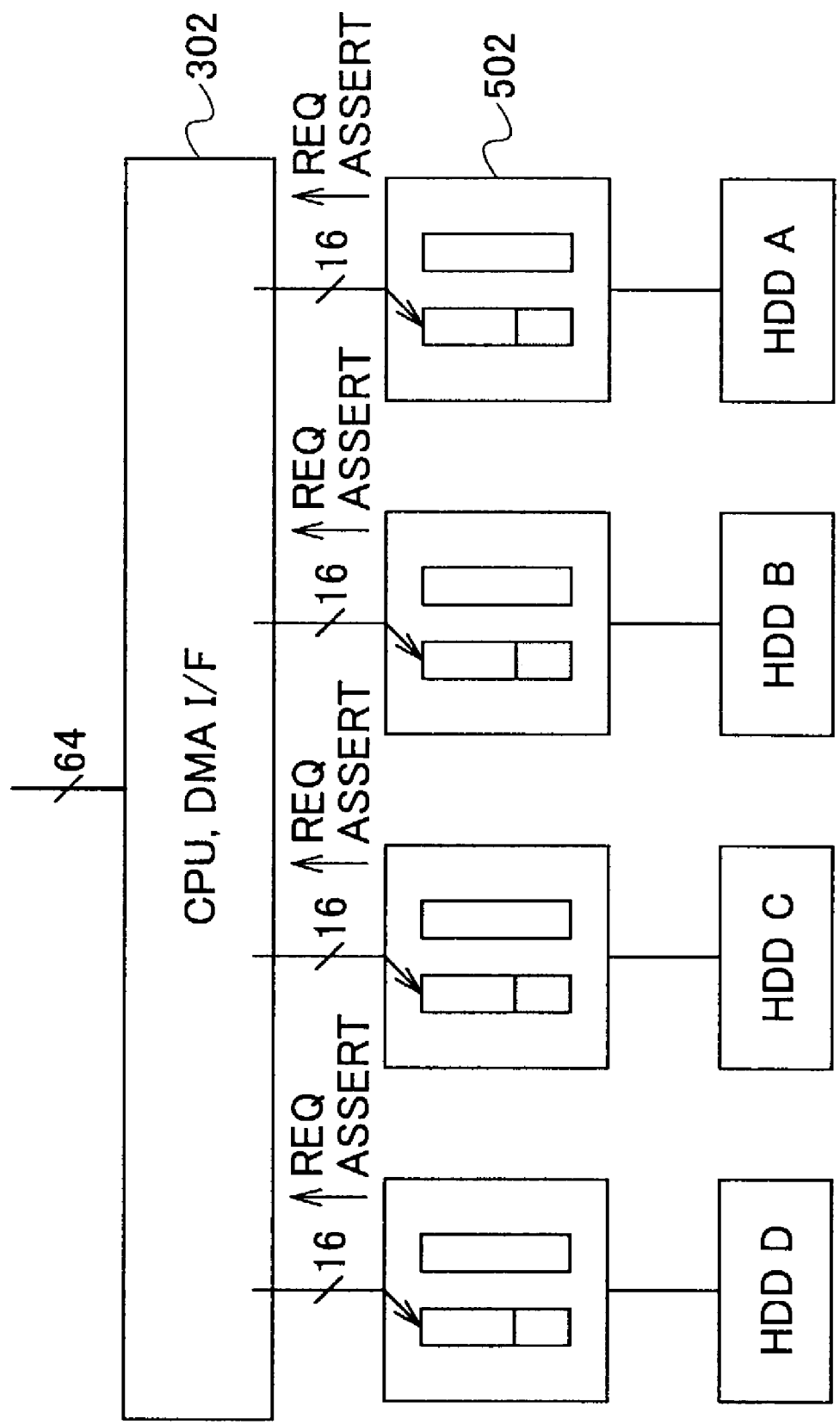
FIG. 10 is a schematic explanation of how the data are divided and stored in the HDDs when all the HDD I/Fs A–D have been asserting REQ signals and the data are being divided prior to being stored into the HDDs.
Figure 11:
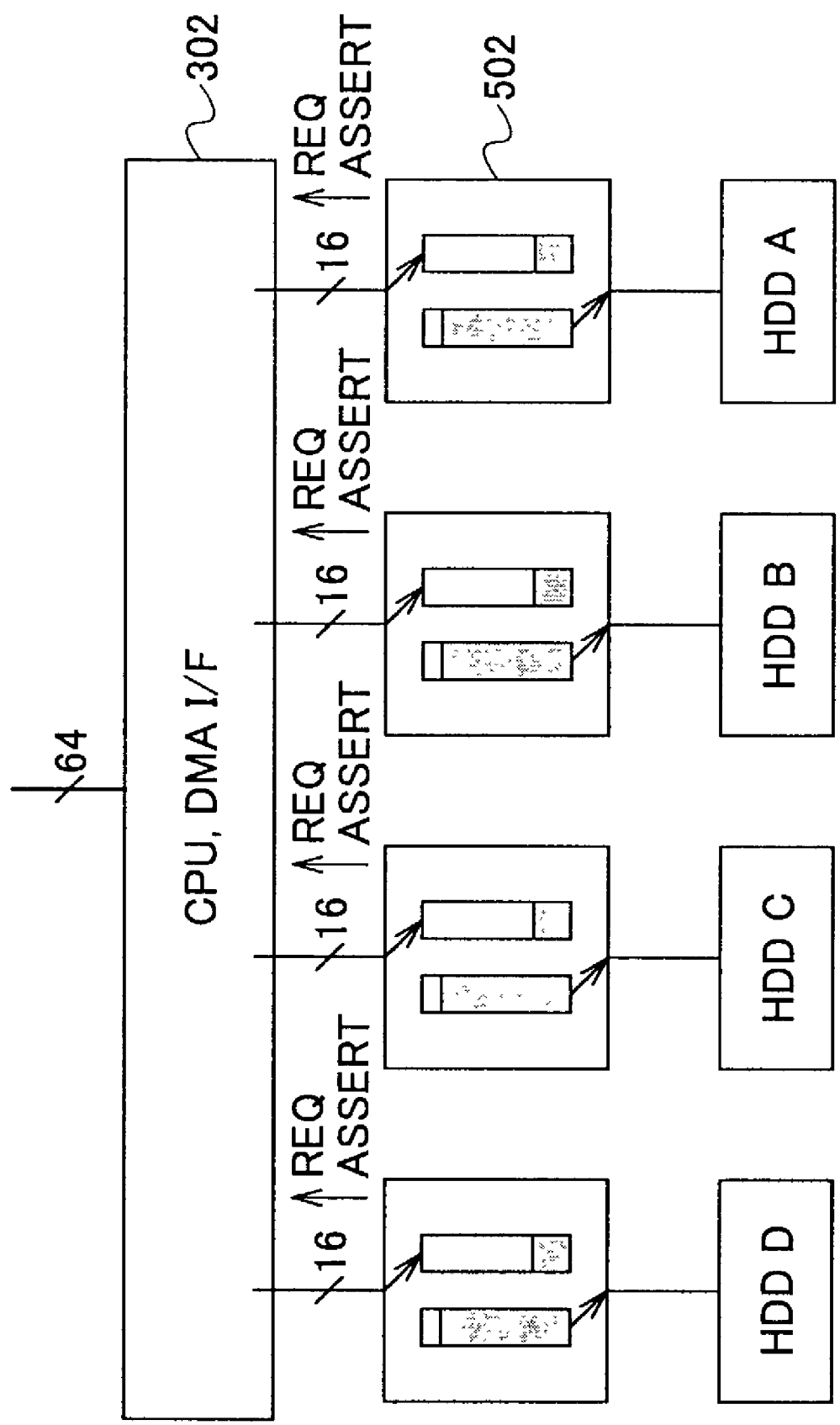
FIG. 11 is a schematic explanation of how the data are divided and stored in the HDDs when all the HDD I/Fs A–D have been asserting REQ signals and the data are still being divided while the HDDs are storing the data.
Figure 12:
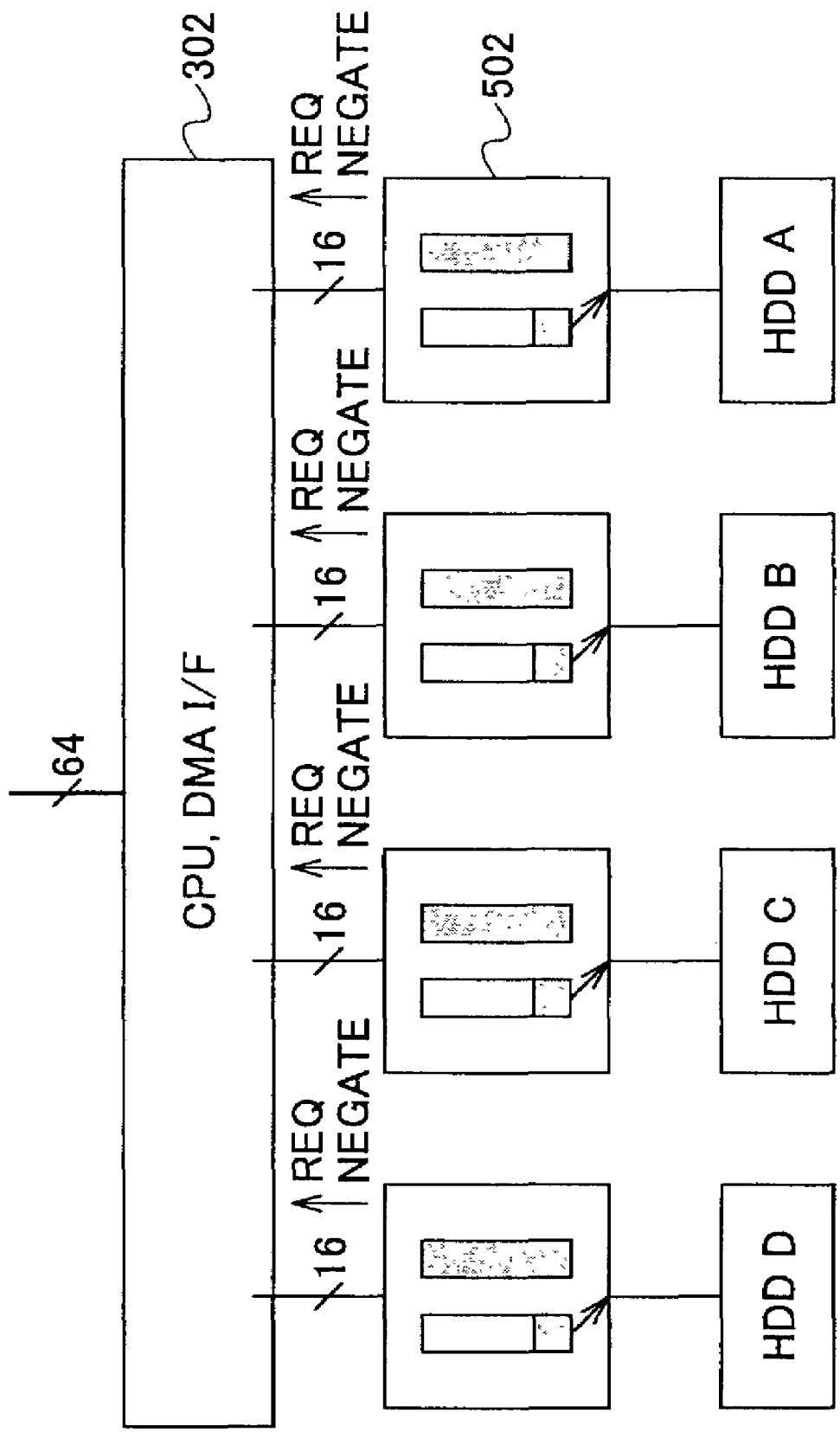
FIG. 12 is a diagram in schematic explanation of how the data are divided and stored in the HDDs when the HDD I/Fs A–D have negated REQ signals and yet the HDDs are storing the divided portions of the data.

Through the HDD I/Fs (A–D), the data are divided into 16-bit sets and are stored into the HDDs (A–D). In order to balance the differences in data transfer rates among the HDDs (A–D), each of the HDD I/Fs (A–D) has FIFOs in a "toggle" manner. Three phases of such a data transfer process using the FIFOs are shown in FIGS. 10–12. When the FIFOs are open for the additional data as in FIGS. 10 and 11, each of the HDD I/Fs (A–D) asserts a REQ signal so as to permit the data transfer. Since the CPU/DMA I/F section 302 is to transfer the data simultaneously to all the HDD I/Fs (A–D) here, such data transfer is performed only when all the HDD I/Fs (A–D) assert the REQ signals.

As shown in FIGS. 11 and 12, the HDD I/Fs (A–D) start the data transfer to the HDDs (A–D) when one of the FIFOs come into a "full" state due to writing of the data from the CPU/DMA I/F section 302. Since there are FIFOs in a "toggle" manner as shown in FIG. 11, the data transfer from the CPU/DMA I/F section 302 to the HDD I/Fs and the data transfer from the HDD I/Fs to the HDDs (A–D) can be performed at the same time. As shown in FIG. 12, however, when one of the pair of FIFOs is "full" and the other is engaged in the data transfer to the HDD, the data transfer to the FIFOs are not possible, in which case the corresponding HDD I/F negates REQ signal. When this situation occurs, the data transfer from the CPU/DMA I/F section 302 is not performed, however, the data transfer from the HDD I/Fs to the HDDs can be continued. Thus, this divided storing of data into the four HDDs (A–D) in parallel in this manner attains a remarkable data transfer performance; the overall data transfer speed is about four times as high as the speed that is obtained when using a single HDD.

Figure 13:
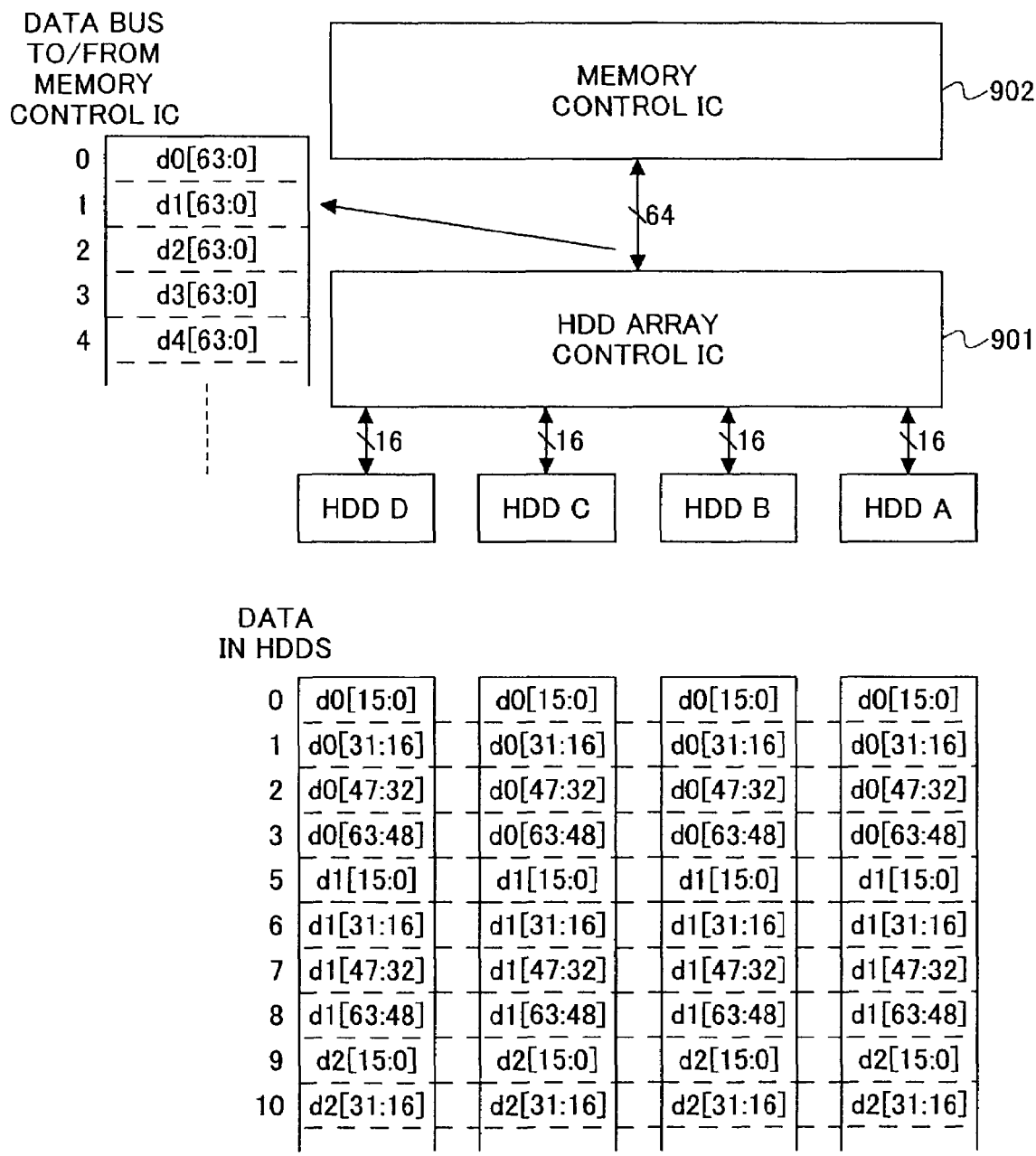
FIG. 13 is a diagram in detailed explanation of an example of a different layout of transferred data in a different-type mode, i.e., when the same data are commonly stored in each of the four HDDs, in the same system of FIG. 9.

Another or the second-type mode for storing data into HDDs is shown in FIG. 13, together with the data format or data layout. In contrast to the first-type mode shown in FIG. 9 in which each of the HDDs (A D) receives respective one of the four 16-bit data sets obtained by dividing the 64-bit data into four buses, this second-type mode does not divide but converts the 64-bit data into 16-bit-wide data parts within the HDD array control IC 901 and then transfers the same 16-bit data part to all the HDDs (A–D). This conversion (no division) of 64-bit data to 16-bit data being performed at the CPU/DMA I/F section 302 (shown in FIG. 3), the operations of each pair of the FIFOs that receive the data and transfer it to the HDDs (A–D) are similar to those explained as above referencing FIGS. 10–12, but, the operation of the second-type mode, as far as its data transfer speed performance is concerned, is merely equivalent to a case when the data from the memory control section 902 are simply transferred into a single HDD, i.e., its speed is equal to the one obtained by a single HDD.

An advantage in this second-type mode is apparent when one of its HDDs does not work properly. Because the data that is identical to the correct data that might have been lost in the malfunctioning HDD has been stored in other HDDs, the correct data can be read out from such other HDDs that have been working normally. In conclusion, the first-type mode shown in FIG. 9 can improve speed, and the second-type mode shown in FIG. 13 can improve reliability.

Figure 14:
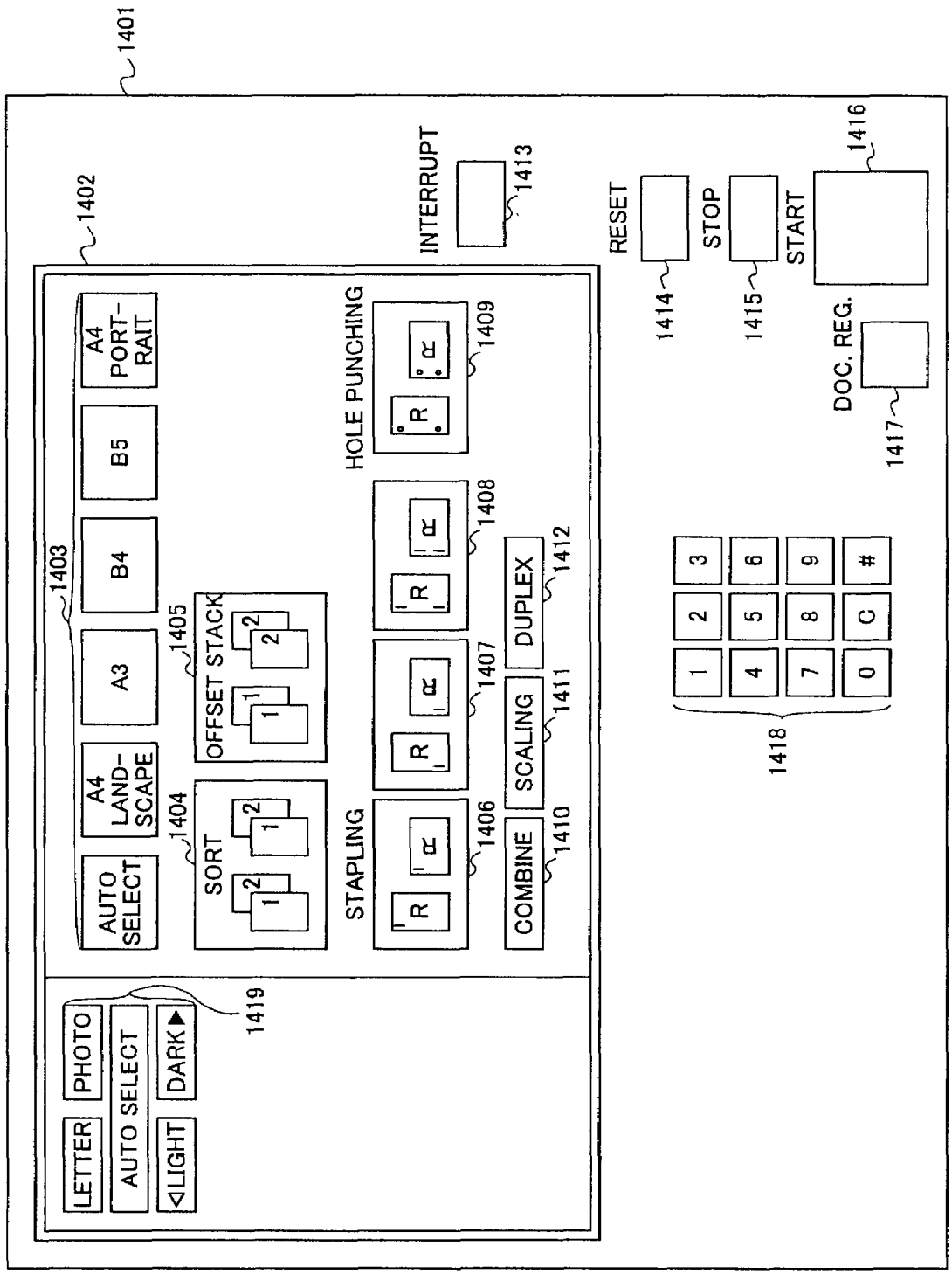
FIG. 14 is a detailed view of a user operation panel of the copier of the embodiment of the present invention.

Next, a method for saving the image data by selecting one of these modes is now described. FIG. 14 shows a user operation panel 1401, which is located at the copier. A LCD 1402 is located in the upper part of the operation panel 1401. A transparent touch panel (or a touch screen) is located on the surface of the LCD 1402. The touch panel detects the operation of the keys indicated in the LCD 1402. Lower than LCD 1402, and in the bottom center section of the panel 1401, a numeric keypad 1418 is located, which is useful for inputting numeric values, such as the number of copies to make, etc. To the right of the LCD 1402 and from top to bottom shown are push buttons: an interrupt button 1413, a reset button 1414, a stop button 1415 and a start button 1416. The interrupt button 1413 is located to perform an interrupt-copy function that is used during a copying operation and allows the copier machine to go into another copying operation that is related to a different copying-mode. The reset button 1414 is located to reset settings such as those made by the numeric keypad. The stop button 1415 is to stop the copying operation while the copier is in motion. The start button 1416 starts the copying operation. To the left of the start button 1416 is a document registration button 1417 which is pushed down for a document registration process.

To operate the copier with its electronic sorting function, first the original copies are placed at the RADF 105. Then a "SORT" key shown in the LCD 1402 is selected and such state is kept until the start, button 1416 is pushed down and the copying operation with the electronic sorting function is performed. When the image data are stored into the HDDs at each copying operation that uses the electronic sorting function, speed is the priority. Once the copying operation is completed, such image data are not reused. Therefore, a speed-oriented transfer mode that divides and transfers the data shown in FIG. 9 from the CPU 202 into the HDDs (A–D) is selected or set to the HDD array control IC 901.

Figure 15:
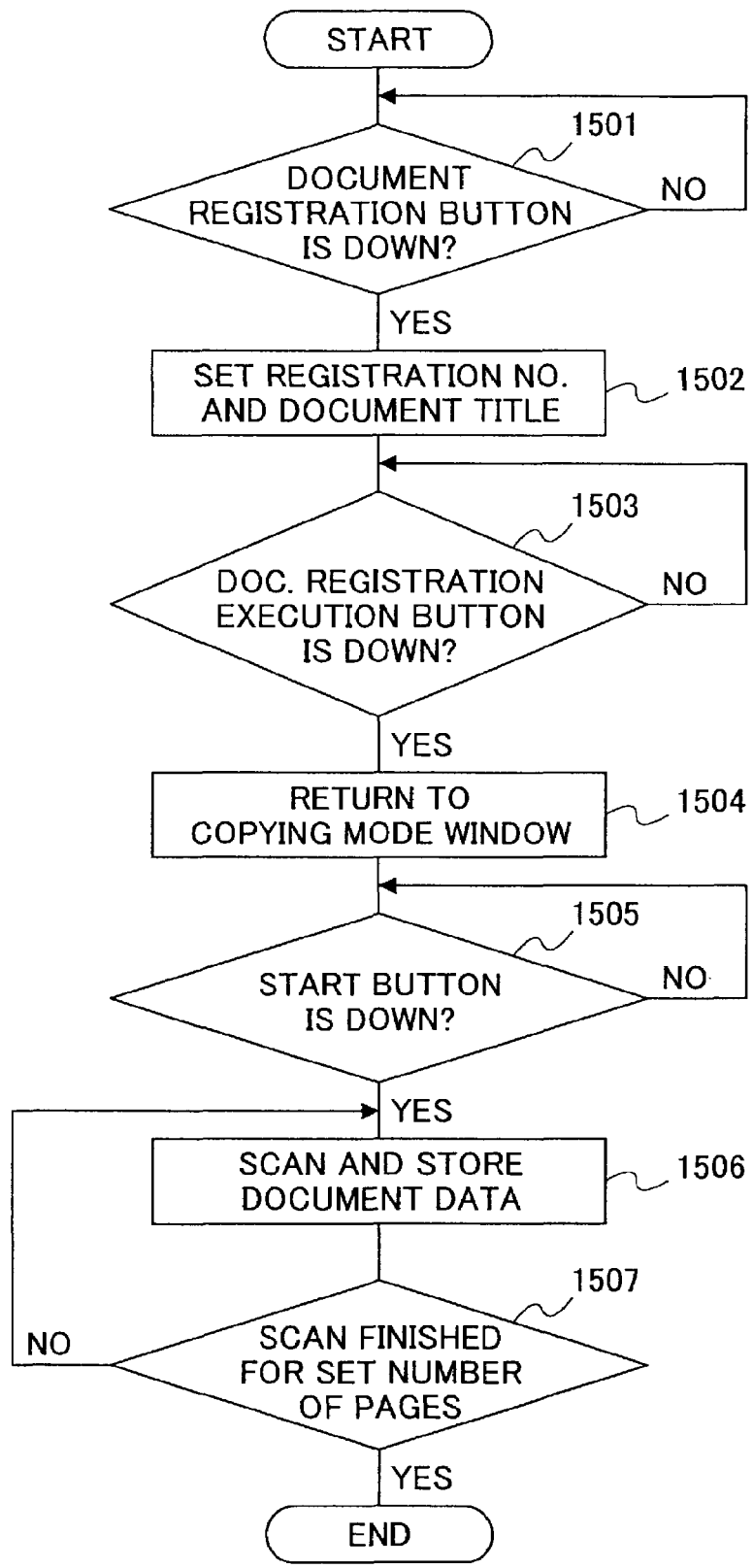
FIG. 15 is a flow chart of the document registration process of the present invention.

As for the document registration function, which can register a document such as a form image, its registration operation flow is now described with reference to FIG. 15. In order to register a document into the HDDs (A–D), first, the document registration button 1417 in the operation panel 1401 in FIG. 14 is pushed down (step 1501). When the button 1417 is pushed down, the LCD 1402 changes from the copy-mode screen into a registered-documents/document-registration-setting screen 1600 shown in FIG. 16. Then settings of a registration number setting key 1601 and a registration name setting key 1602 are performed (step 1502). By pushing a registration execution key 1603 (step 1503), settings for the registration are finished, thereby returning into the copy-mode screen again (1504). By pushing down the start button 1416 (step 1505) when the settings for registration are thus finished, the original copies are scanned and the data of the document is stored into the HDDs A–D (step 1506). When a number of pages according to the setting have been successfully scanned, the document registration is finished (step 1507).

In the document registration, the transfer mode shown in FIG. 13 is set to the HDD array control IC 901, wherein the same data are transferred to all the HDDs (A–D) and therefore the data are not lost even if a HDD does not work properly. In this manner, by changing the data format (or data layout) used to store the data into the HDD array 207 in response to the intended use of the data, either the speed-oriented data format (or data layout) or the data-reliability-oriented one can be selected. Further, although the data to be stored in the HDDs (A–D) has been shown as image data in the above example, the data may be other data such as management data or control parameters in order to store the initial condition of the system. When the system management data are stored into the HDDs (A–D), it requires reliability rather than speed, therefore the data transfer mode (shown in FIG. 13) that transfers the same data to all the HDDs (A–D) is selected.

Figure 17:
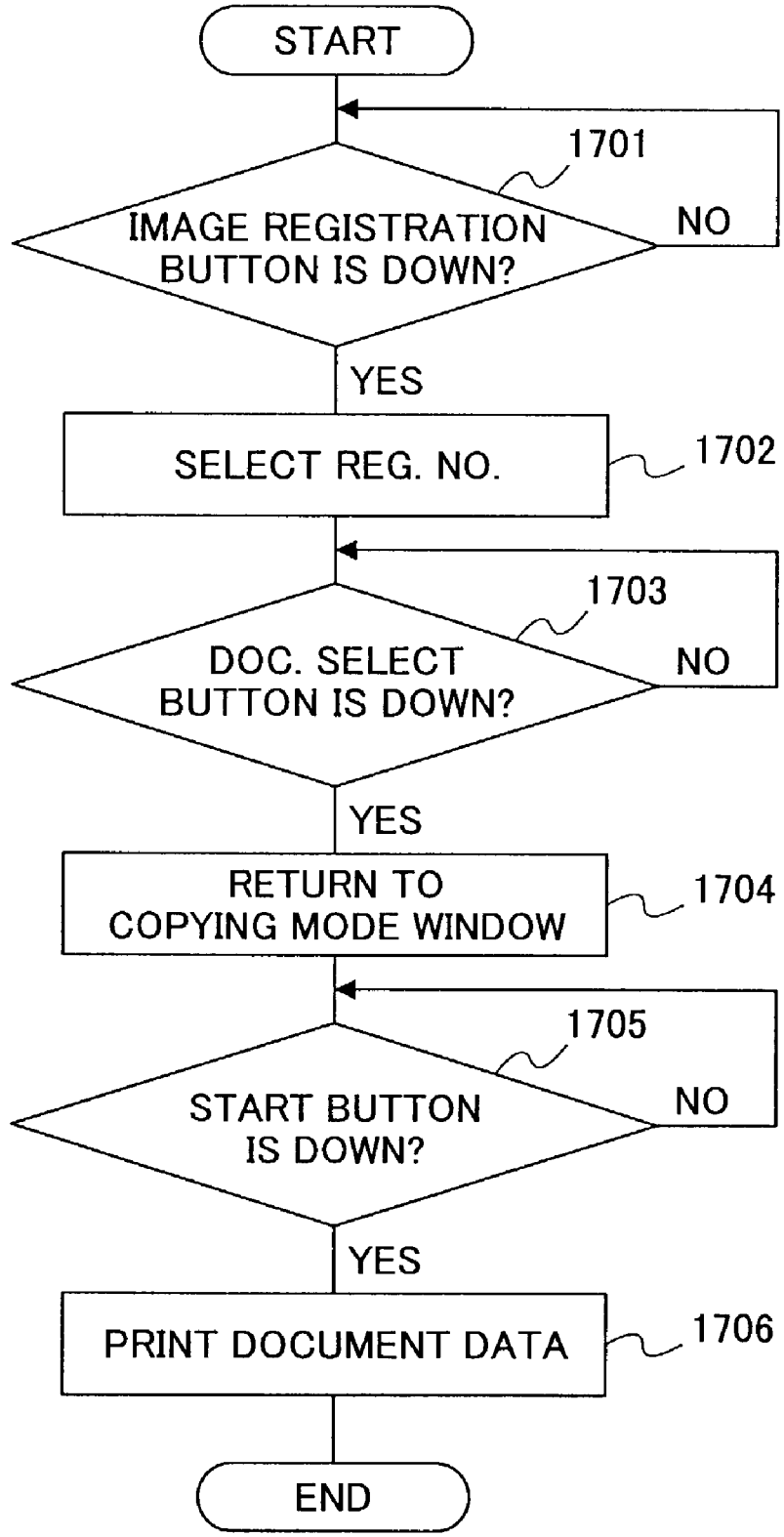
FIG. 17 is a flow chart of the registered document print out process of the present invention.

Next, a method for reading out and utilizing the data commonly stored in every one of the four HDDs, such as the above described data of the registered documents, is now described. In this system, correct images of the registered documents can be obtained (or recovered) even when the data are damaged (or mixed up, corrupted, etc.) in one of the HDDs. An example of such an operation is described below. The control flow of the reading out process when the registered documents are read out is explained with reference to FIG. 17.

Figure 16:
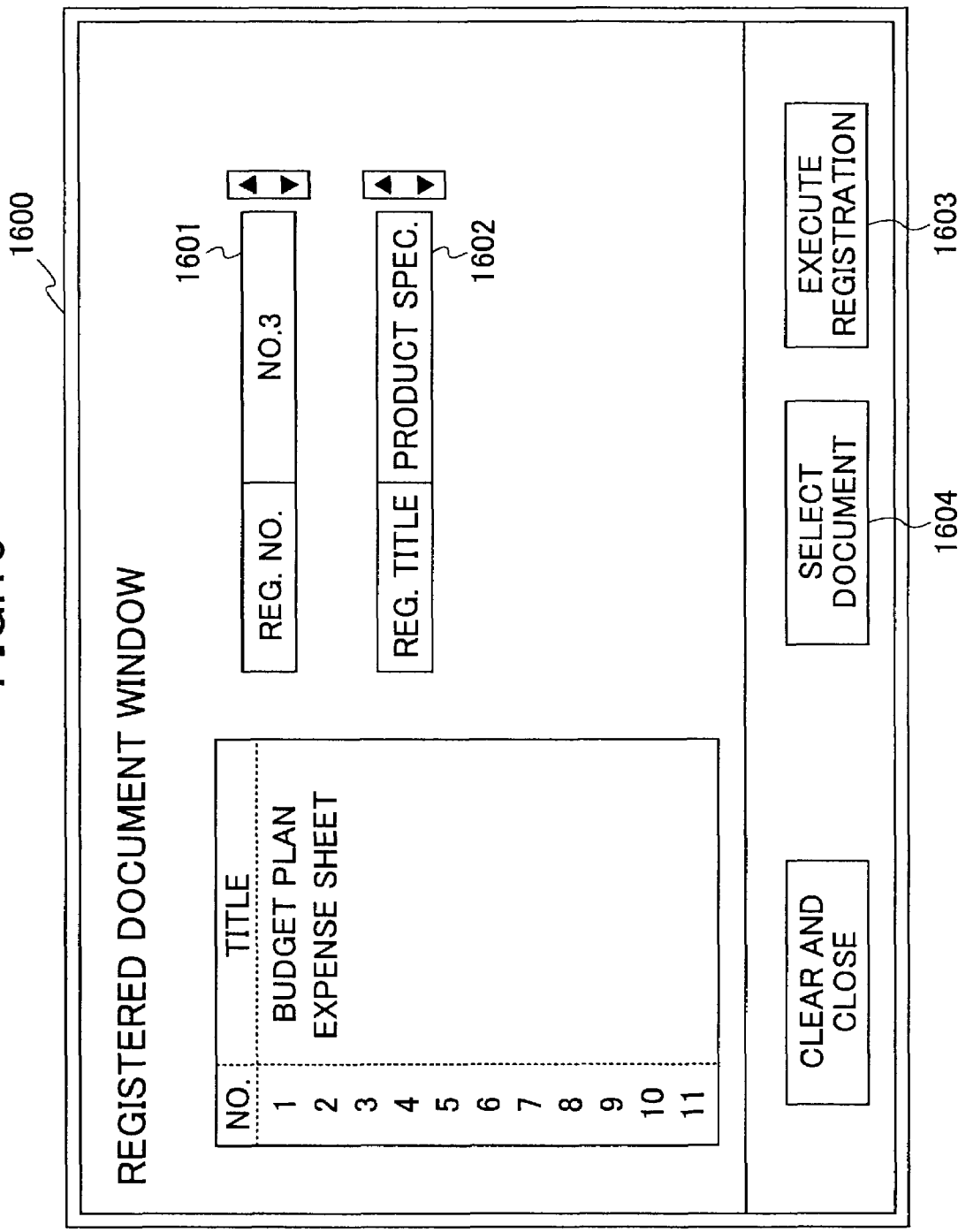
FIG. 16 is a detailed view of a registered-document-list/document-registration-setting window that appears in a LCD of the user operation panel of FIG. 14.

When the document registration button 1417 in FIG. 14 is pushed down, the LCD 1402 comes into the document-registration-setting screen 1600 shown in FIG. 16 (step 1701). Next, the setting of the registration number 1601 is performed (step 1702) and a print document selection key 1604 is pushed so as to select the registered document (1703). When the selection has been done, the document-registration-setting screen 1600 is turned into the copying-mode screen (step 1704). After that, when the start button 1416 is pushed down, the copier machine reads out the image data of the document that has been registered in the HDDs (A–D) and prints out the image (1706).

Figure 18:
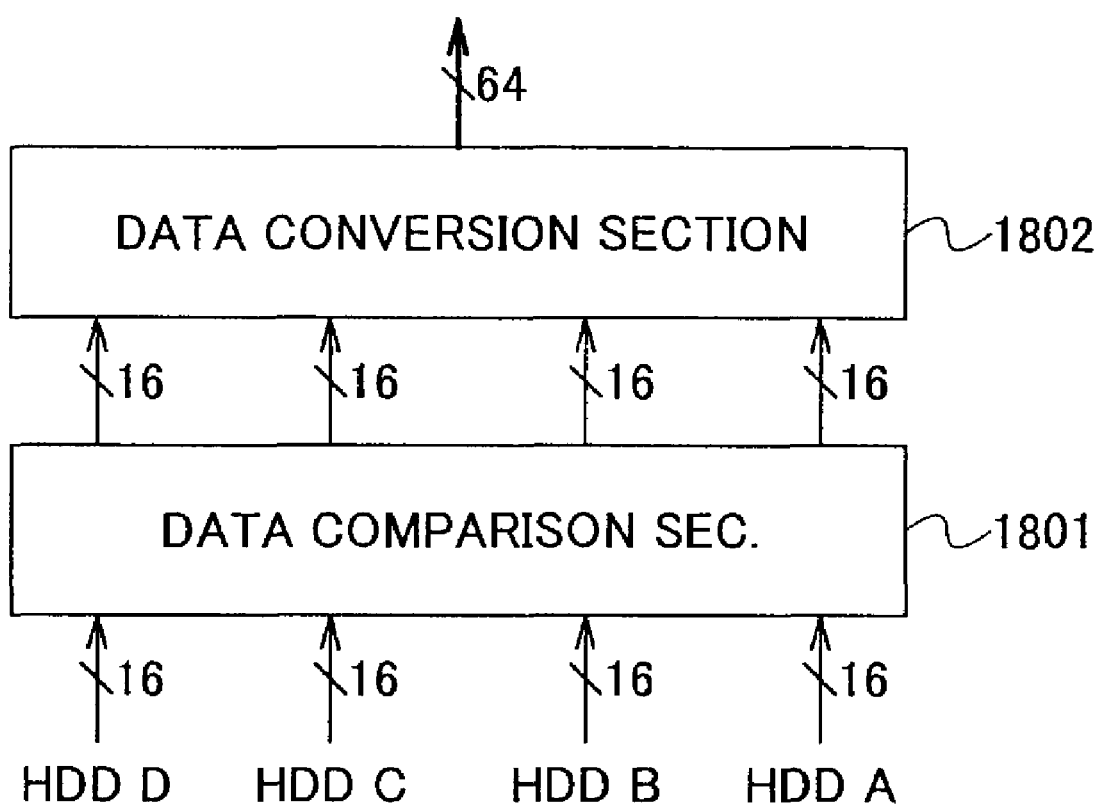
FIG. 18 is a block diagram showing in detail an abnormal data detection process section, which is located within the CPU/DMA I/F (CPU/DMA interface) 302 of FIG. 3.

FIG. 18 is a block diagram of some circuits in the CPU/DMA I/F 302, which is used when the data are read out from the HDDs (A–D). The data comparison section 1801 receives data input from the FIFOs. The section 1801 performs the data comparison per every "1 word" (or specific bit length data) on the data corresponding to each of the HDDs (A–D) only when the aforementioned registered image is read out. If all the data are equal according to the performed comparison, the data from the HDD (A) are directly input into a data conversion section 1802. The data conversion section organizes the input 16-bit data into the 64-bit data output, which is sent to the DMA control section 502. On the other hand, if the data from HDD (A) are compared with the corresponding data from other HDDs (B–D) and they are not equal according to the comparison, for example, if the data from HDD (A) are 0000H and the data from any of the other HDDs (B–D) are FFFFH, then the input to the data conversion section 1802 is switched so that the data from HDD (B) are input to the section 1802. In this manner, leveraging what is done by the aforementioned process that stores the same data in each HDD, data correction can be made even when a problem occurs in the data in a HDD.

Further, since the HDD having the data trouble can be detected, such a HDD malfunction can be informed of by displaying a malfunction notice window (shown in FIG. 19) in the LCD 1402 of the user operation panel 1401. On the other hand, when the image data are being read out from the HDDs (A–D) during a copying operation using the electronic sorting function, the data comparison section 1801 does not provide any substantive effect but just interfaces the data from the HDDs (A–D) with the data conversion section 1802, and the data conversion section 1802 does not perform data conversion but just interfaces the data with the DMA control section 502.

By the way, suppose a document registration is done in the system in the above example of the present invention and after that a HDD is replaced due to its malfunction, etc., and the replacement HDD A1 that has just been connected to the system instead of the previous HDD A0 does not have the document registration data as all the other HDDs B–D do. Therefore, in this embodiment of the present invention, after a replacement of a HDD, the document registration data from the other HDDs B–D are copied into the corresponding addresses of the replacement HDD A1 that has just been connected to the system instead of a previous HDD. To be more precise, when the system power is switched on, processes like setting of data transfer mode, etc., are carried out. Then, the CPU 202 reads the addresses of the HDD management area. In order to determine whether the HDD is a new one or not, the new HDD identification word located in the HDD management area is checked. If a value that shows that the HDD is not a new one has not been written in the "word", the HDD is recognized as a new or replacement HDD. In this case, this new HDD further receives transfer of the image data of the registered documents from a HDD having a "word" (or "new HDD identification word") in which a value that shows that the HDD is not a new one is written.

With reference to the flow chart shown in FIG. 20, the above process flow is described in more detail. After the power switch SW is turned ON (step 2001), the CPU 202 performs initial settings (step 2002) for the HDDs (A–D) such as data transfer mode, etc. Next, the "new HDD identification word" checks are performed against the HDDs (A–D) (step 2003), to detect whether or not each of them is a replacement HDD. If all the HDDs are new or replacement HDDs (step 2004), "word" data that assumes that the HDD is not a new one is written into each "new HDD identification word" (step 2010) and the process is ended (i.e., HDDs detected as new HDDs in step 2003 no more have to be treated as new HDDs). If none of the HDDs is a new or replacement HDD (step 2005), nothing is done and the process is ended. If there is a new or replacement HDD, a management area of a non-new HDD is read to check whether there is a registered image document (2006), wherein if the check result is NO (there is no registered image document in this non-new HDD), "word" data that assumes that the HDD is not a new one is written into a "new HDD identification word" for each of the new HDDs (step 2010) and the process is ended (i.e., HDDs detected as new HDDs in step 2003 no more have to be treated as new HDDs). If the check result is YES (there are registered image documents in the non-new HDD), the registered image documents in the non-new HDD are read out in the order of management number and extracted (or developed) into the image memory 205 (step 2007), then the image is transferred to the new HDD (step 2008). In this manner, all the registered images are transferred and its completion is checked (step 2009). When the transfer of all the registered images is completed, then "word" data that assumes that the HDD is not a new one is written into a "new HDD identification word" for each of the new HDDs (step 2010) and the process is ended (i.e., HDDs detected as new HDDs in step 2003 no more have to be treated as new HDDs). If such writing of the data of the registered documents into a new or replacement HDD is accomplished, written data that is now present in this HDD can be used, especially when it further happens that another HDD has some trouble. Therefore, this feature can further reduce the chances of loss with regard to the data of the registered documents.

The present invention is not limited to the specifically disclosed embodiments, and variations and modifications may be made without departing from the scope of the present invention.

This application claims priority rights of and is based on Japanese patent application No. JPAP2001-287545 filed on Sep. 20, 2001 in the Japanese Patent Office, the entire contents of which are hereby incorporated by reference.

What is claimed is:

1. An image data storage system, comprising:

a plurality of storage units for storing image data, wherein each said plurality of storage units can temporarily store said image data or store said image data for a long-term preservation;

a determination unit for determining intended use of the image data that is to be stored at said storage units;

a selection unit for selecting an image storing mode for storing said image data into one of said plurality of storage units, wherein the selection is performed based on the determined intended use of the image data; and a data saving unit for saving said image data into at least one of said plurality of storage units in accordance with the image storing mode selected by said selection unit; and wherein said selection unit selects one of a first storage mode and a second storage mode, the first storage mode for storing image data divided into sets of data, each of said sets of image data being stored into a corresponding one of said plurality of storage units, the second storage mode for storing image data into at least two of said plurality of storage units, each of said at least two storage units storing an identical part of said image data; and wherein when said data part stored by said second storage mode is read out, each said data part is read out from each of said at least two of said plurality of storage units, and determination is made whether said data part read out from one of said plurality of storage units is abnormal data so as to select and output said data part read out from one of said plurality of storage units other than the abnormal data.

2. The image data storage system as claimed in claim 1, wherein a notice is displayed with respect to said one of said plurality of storage units in which said abnormal data has occurred.

3. An image data storage system, comprising:

a plurality of storage units for storing image data;

a determination unit for determining intended use of the image data that is to be stored at said storage units;

a selection unit for selecting an image storing mode for storing said image data into one of said plurality of storage units, wherein the selection is performed based on the determined intended use of the image data, wherein said selection unit selects one of a first storage mode and a second storage mode, the first storage mode for storing image data divided into sets of data, each of said sets of image data being stored into a corresponding one of said plurality of storage units, the second storage mode for storing image data into at least two of said plurality of storage units, each of said at least two storage units storing an identical part of said image data; and a data saving unit for saving said image data into at least one of said plurality of storage units in accordance with the image storing mode selected by said selection unit, wherein when the image data storage system is initialized and if a certain one of said plurality of storage units that lacks a history of usage is detected based on histories of usage in said plurality of storage units, the image data stored by said second storage mode in another one of said plurality of storage units that has usage history is duplicated into said certain one of said plurality of storage units that lacks said history of usage.

4. An image data storage system, comprising:

a plurality of storage units for storing image data;

a determination unit for determining intended use of the image data that is to be stored at said plurality of storage units;

a selection unit for selecting an image storing mode for storing said image data into one of said plurality of storage units, wherein the selection is performed based on the determined intended use of the image data; and a data saving unit for saving said image data into at least one of said plurality of storage units in accordance with the image storing mode selected by said selection unit, wherein the image storing mode selected by said selection unit stores image data into at least two of said plurality of storage units, each of said at least two of said plurality of storage units storing an identical part of said image data, and wherein when the image data storage system is initialized and if a certain one of said plurality of storage units that lacks a history of usage is detected based on histories of usage in said plurality of storage units, the image data stored by said image storing mode in another one of said plurality of storage units that has usage history is duplicated into said certain one of said plurality of storage units that lacks said history of usage.

5. A method for image data storage, said method comprising the steps of:

storing image data;

determining intended use of the image data that is to be stored at said storage means; and selecting an image storing mode for storing said image data into one of said plurality of storage means, wherein the selection is performed based on the determined intended use of the image data; and wherein said selection means selects one of a first storage mode and a second storage mode, the first storage mode for storing image data divided into sets of data, each of said sets of image data being stored into a corresponding one of said plurality of storage means, the second storage mode for storing image data into at least two of said plurality of storage means, each of said at least two storage means storing an identical part of said image data; and wherein when said data part stored by said second storage mode is read out, each said data part is read out from each of said at least two of said plurality of storage means, and determination is made whether said data part read out from one of said plurality of storage means is abnormal data so as to select and output said data part read out from one of said plurality of storage means other than the abnormal data.

6. The method for image data storage system as claimed in claim 5, wherein a notice is displayed with respect to said one of said plurality of storage means in which said abnormal data has occurred.

7. A method for image data storage, said method comprising the steps of:

storing image data;

determining intended use of the image data that is to be stored at said storage means;

selecting an image storing mode for storing said image data into one of said plurality of storage means, wherein the selection is performed based on the determined intended use of the image data, wherein said selection means selects one of a first storage mode and a second storage mode, the first storage mode for storing image data divided into sets of data, each of said sets of image data being stored into a corresponding one of said plurality of storage means, the second storage mode for storing image data into at least two of said plurality of storage means, each of said at least two storage means storing an identical part of said image data; and saving said image data into at least one of said plurality of storage means in accordance with the image storing mode selected by said selection means, wherein when the image data storage system is initialized and if a certain one of said plurality of storage means that lacks a history of usage is detected based on histories of usage in said plurality of storage means, the image data stored by said second storage mode in another one of said plurality of storage means that has usage history is duplicated into said certain one of said plurality of storage means that lacks said history of usage.

8. A method for image data storage, said method comprising the steps of:
storing image data;
determining intended use of the image data that is to be stored at plurality of said storage means;
selecting an image storing mode for storing said image data into one of said plurality of storage means, wherein the selection is performed based on the determined intended use of the image data; and
saving said image data into at least one of said plurality of storage means in accordance with the image storing mode selected by said selection means,
wherein the image storing mode selected by said selection means stores image data into at least two of said plurality of storage means, each of said at least two of said plurality of storage means storing an identical part of said image data, and
wherein when the image data storage system is initialized and if a certain one of said plurality of storage means that lacks a history of usage is detected based on histories of usage in said plurality of storage means, the image data stored by said image storing mode in another one of said plurality of storage means that has usage history is duplicated into said certain one of said plurality of storage means that lacks said history of usage.

9. An image data storage system, comprising:
a plurality of storage means for storing image data;
determination means for determining intended use of the image data that is to be stored at said storage means;
selection means for selecting an image storing mode for storing said image data into one of said plurality of storage means, wherein the selection is performed based on the determined intended use of the image data, wherein said selection means selects one of a first storage mode and a second storage mode,
the first storage mode for storing image data divided into sets of data, each of said sets of image data being stored into a corresponding one of said plurality of storage means,
the second storage mode for storing image data into at least two of said plurality of storage means, each of said at least two storage means storing an identical part of said image data; and
data saving means for saving said image data into at least one of said plurality of storage means in accordance with the image storing mode selected by said selection means,
wherein when the image data storage system is initialized and if a certain one of said plurality of storage means that lacks a history of usage is detected based on histories of usage in said plurality of storage means, the image data stored by said second storage mode in another one of said plurality of storage means that has usage history is duplicated into said certain one of said plurality of storage means that lacks said history of usage.

10. An image data storage system, comprising:
a plurality of storage means for storing image data;
determination means for determining intended use of the image data that is to be stored at said plurality of storage means;
selection means for selecting an image storing mode for storing said image data into one of said plurality of storage means, wherein the selection is performed based on the determined intended use of the image data; and
data saving means for saving said image data into at least one of said plurality of storage means in accordance with the image storing mode selected by said selection means,
wherein the image storing mode selected by said selection means stores image data into at least two of said plurality of storage means, each of said at least two of said plurality of storage means storing an identical part of said image data, and
wherein when the image data storage system is initialized and if a certain one of said plurality of storage means that lacks a history of usage is detected based on histories of usage in said plurality of storage means, the image data stored by said image storing mode in another one of said plurality of storage means that has usage history is duplicated into said certain one of said plurality of storage means that lacks said history of usage.

* * * * *